(12) United States Patent
Hendrix et al.

(10) Patent No.: US 11,880,293 B1
(45) Date of Patent: Jan. 23, 2024

(54) CONTINUOUS TRACING AND METRIC COLLECTION SYSTEM

(71) Applicant: Zoox, Inc., Foster City, CA (US)

(72) Inventors: Austin Hendrix, Redwood City, CA (US); Andrew Lewis King, Los Altos, CA (US); Thomas Michael Flanagan, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 703 days.

(21) Appl. No.: 16/696,597

(22) Filed: Nov. 26, 2019

(51) Int. Cl.
*G05D 1/00* (2006.01)
*G06F 11/36* (2006.01)
*G06F 16/23* (2019.01)
*G06N 20/00* (2019.01)
*G06F 9/445* (2018.01)

(52) U.S. Cl.
CPC .......... *G06F 11/362* (2013.01); *G05D 1/0011* (2013.01); *G05D 1/0088* (2013.01); *G06F 16/2322* (2019.01); *G06F 9/445* (2013.01); *G06N 20/00* (2019.01)

(58) Field of Classification Search
CPC ............... G06F 16/2322; G06F 9/445; G06F 11/3466; G06F 11/362; G06N 20/00; G05D 1/088
USPC ..................................... 701/23–28
See application file for complete search history.

(56) References Cited

U.S. PATENT DOCUMENTS

| | | | | |
|---|---|---|---|---|
| 8,464,102 B2* | 6/2013 | Sinha | ............... | G06F 11/0715 714/39 |
| 8,618,954 B2* | 12/2013 | Free | ................... | G08G 1/09675 340/606 |
| 10,466,717 B1* | 11/2019 | Su | ...................... | G06N 3/045 |
| 10,635,108 B2* | 4/2020 | Liu | ...................... | G05D 1/0088 |
| 10,983,526 B2* | 4/2021 | Golestan Irani | .... | G01C 21/3848 |
| 11,150,660 B1* | 10/2021 | Kabirzadeh | .......... | G05D 1/0088 |
| 2010/0106356 A1* | 4/2010 | Trepagnier | ........... | G05D 1/0248 701/25 |
| 2010/0183016 A1* | 7/2010 | Bonk | .................... | G05D 1/0077 709/248 |
| 2012/0140861 A1* | 6/2012 | Menon | ...................... | B60T 7/18 375/356 |
| 2012/0166878 A1* | 6/2012 | Sinha | .................. | G06F 11/0715 714/E11.029 |
| 2012/0209971 A1* | 8/2012 | Howe | ................. | H04L 63/0428 709/223 |
| 2015/0331422 A1* | 11/2015 | Hartung | .................... | G05D 1/02 701/23 |
| 2016/0352388 A1* | 12/2016 | Lane | ..................... | H04B 1/3822 |
| 2017/0090476 A1* | 3/2017 | Letwin | ................. | G05D 1/0212 |
| 2019/0361436 A1* | 11/2019 | Ueda | ........................ | G08G 1/09 |
| 2020/0192366 A1* | 6/2020 | Levinson | .............. | G01S 15/931 |
| 2021/0046923 A1* | 2/2021 | Olson | .................. | G05D 1/0214 |
| 2021/0157325 A1* | 5/2021 | Beller | ................. | B60W 60/001 |

* cited by examiner

Primary Examiner — Jonathan L Sample

(74) Attorney, Agent, or Firm — Lee & Hayes, P.C.

(57) ABSTRACT

Techniques for capturing and recording processor events and scheduler data in a production system on a per processing resource basis are discussed herein. In some examples, a process metric collection component may be associated with the scheduler and the processing resource such that the process metric collection component can capture real time data associated with the processes or threads both executed by the processing resource and waiting to execute on the processing resource. The captured data may be used by the system to monitor operations.

18 Claims, 7 Drawing Sheets

US 11,880,293 B1

CONTINUOUS TRACING AND METRIC COLLECTION SYSTEM

BACKGROUND

Typically, software developers utilize a test environment and/or test hardware during development to identify and address any issues or bugs associated with the product under development. Once testing is complete, the product is released or moved to a production environment. The production environments are typically similar to the test environment but often does not include any testing or data recording components, as the testing or data recording components consume processing resources, thereby reducing performance of the finished product. However, if an issue or bug is identified in the production environment, the developers are then tasked with reproducing the issue or bug in the test environment in order to identify and address the issue or bug. In some situations, issue or bug correction may be time sensitive and/or recreation of the issue or bug may be difficult, particularly in today's increasing complex production environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
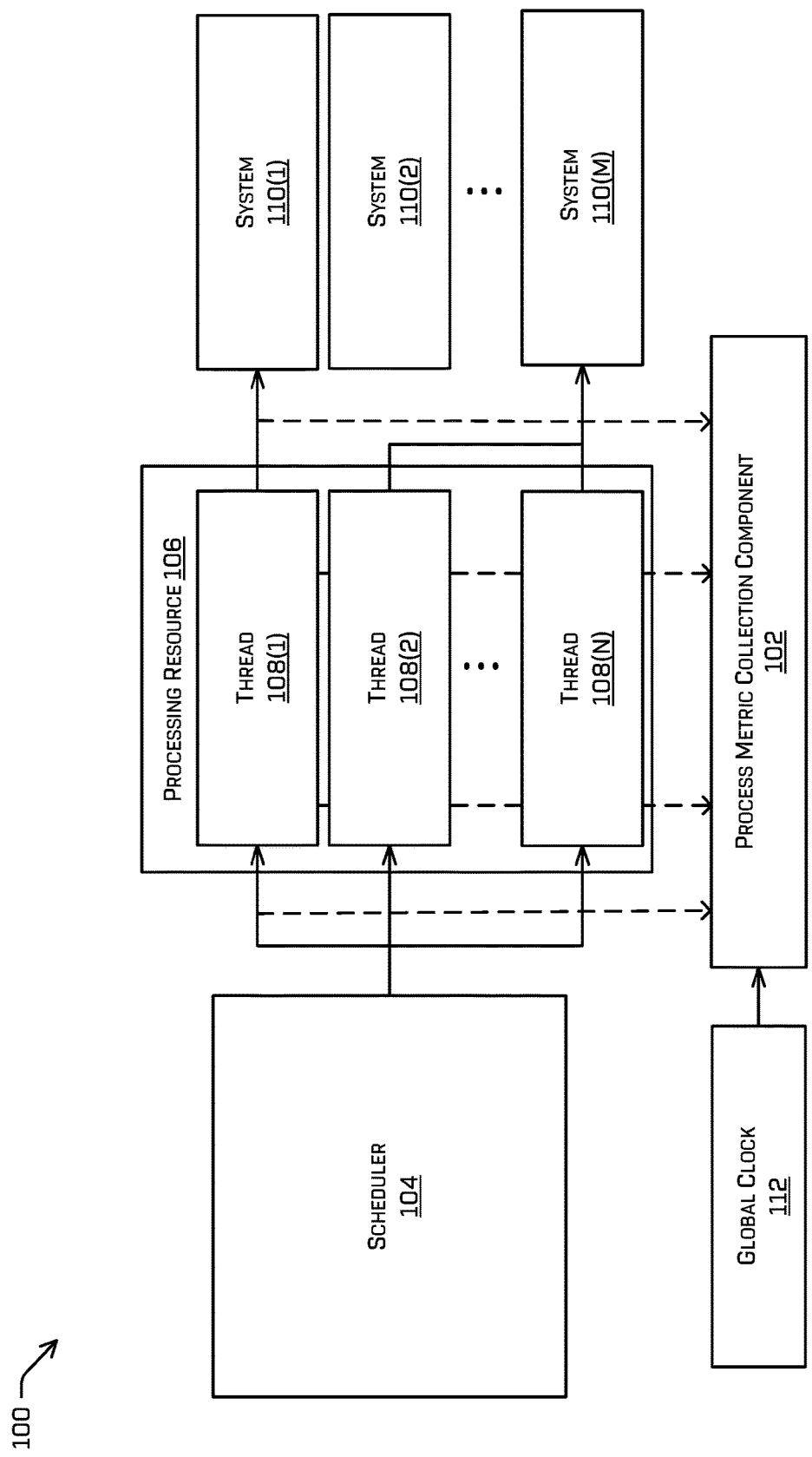
FIG. 1 is a process flow diagram illustrating an example data flow of a production system including integrated data and process metric collection component, as described herein.

Techniques described herein are directed to a production system that may include one or more data and process metric collection components. In some examples, the data and process metric collection components may be configured to track and record process and scheduler related metrics for each process that is executed by production system while the production system is in operation. In some cases, the data and process metric collection components are configured to track and record each process of the production system across multiple processing resources using a global clock. Thus, in the system discussed herein, if an issue occurs during operation, actual production data associated with each processing resource and each process is available to compare and analyze using synchronized time stamps without having to recreate the issue in a test environment.

In some examples, such as operations of an autonomous vehicle, recreation of a bug or issue in a test environment may be exceedingly difficult as a reoccurrence of the bug or issue may depend on countless ever-adjusting and changing variables typical of real life physical environment (e.g., system conditions, traffic conditions, weather conditions, etc.). Additionally, in these types of examples, any delay in correcting the bug or issue may introduce uncertainty or may increase risks for vehicle operation. Thus, the system discussed herein allows for identification and correction of bugs or issues using logs and data generated, analyzed, and/or stored during operation of the actual production environment. In some cases, the data and process metric collection components, discussed herein, are able to track and record the production logs without causing a reduction in the performance of the overall system (e.g., the processing resources of the autonomous vehicle).

In some cases, each process metric collection component may be configured to send, via one or more networks, messages including the logs or recorded data to a remote debugging system for storage. In some examples, the process metric collection component may be integrated into a message logging framework that translates the collected data into a message that may be sent to the debugging system for aggregation, metric calculation (e.g., cache misses, cycles per processor or instruction, etc.), and other processing. In this manner, the debugging system may be configured to aggregate the production data not only across multiple processing resources of the same device (e.g., vehicle) but also between processing resources of different devices (e.g., over the fleet of vehicles). In some cases, the debugging system may generate various graphical user interfaces that may present the data and process metrics in various manners to programmers to assist with locating and correcting any issues identified. In some cases, the debugging system and/or the vehicle may be configured to identify the presence of a potential issues. For example, an operating vehicle may initiate an emergency stop due to a failure in a perception pipeline to timely perform object recognition, thereby preventing a potential collision. In this case, the vehicle or the debugging system may determine that the emergency stop was due to a bug or issue in the code. In this case, the debugging system may present, via a graphical user interface, the production data associated with a time span or window around the emergency stop. Allowing the programmer to identify any stalled, hung-up, or waiting processes in a time efficient manner.

In some implementations, the data and process metrics collected may include the process itself, one or more time stamps corresponding to the time at which the process was requested, a time stamp corresponding to the time at which the process was initiated, a time stamp corresponding to the time at which the process was completed, priority of the process, and/or the particular processing resource that executed the process. As a specific example, the data and process metrics collected may include or be usable to determine instructions stalls, cycles per instruction, cache misses, bandwidth per socket or processing resource, thread creation and destruction, priority of each process, among others.

In some examples, the data and process metric collection components may be configured to log the process data based on scheduler events. Thus, unlike other conventional systems that may track data based on a fixed rate, the system discussed herein, may continuously log data for each event associated with the scheduler allowing for easier identification of the particular process that is associated with the delay or issue. In this manner, each time the scheduler changes a process executing on a processing resource, the event may be logged with global time stamps that may be used to correlate various process on various processing resources at a later date and to generate counters as part of the scheduler events.

In one specific example, the data and process metric collection components may be integrated into a kernel of a processing resource. For example, the data and process metric collection component may be loaded into, for example, a Linux kernel using a Berkeley packet filter. In this manner, the data and process metric collection components may then be associated with the scheduler to capture the scheduler event data and correlate the scheduler events to the process execution on the processing resource.

In one specific example, the logs and recorded data may be used to generate models or training data sets that may be used to simulate, test, and as input to train machine learned algorithms, as the logs and recorded data represent real life operational situations. The models or training data sets can be used to improve a functioning of a computing device by providing additional data usable for performing subsequent operations to control autonomous vehicles. For example, models or training data sets associated with image data can allow subsequent processes such as localization, perception (e.g., detecting, identifying, segmenting, classifying, tracking, etc.), route planning, trajectory generation, and the like to be performed more accurately, may require less processing power, and/or may require less memory. For example, in some instances, faster and/or more accurate segmentation (or other processes) can be used in generating a trajectory of an autonomous vehicle, which can improve safety for occupants of an autonomous vehicle. These and other improvements to the functioning of the computer are discussed herein.

FIG. 1 is a process flow diagram illustrating an example data flow 100 of a production system including integrated process metric collection components 102, as described herein. In the current example, a scheduler 104 may be communicatively coupled to a processing resource 106 in order to schedule processes on the processing resource 106 to execute as one or more processes, illustrated as threads 108(1)-(N). Once each thread 108(1)-(N) completes execution on the processing resource 106, the output of the thread 108 may be provided to or received by another system or component, illustrated, herein, as system 110(1)-(M).

In the illustrated example, the process metric collection component 102 may be communicatively coupled to or between the scheduler 104 and the processing resource 106 and between the processing resource 106 and the other systems 110. The process metric collection component 102 may also be configured to monitor, receive, or capture process or thread data associated with the threads 108 in progress. For instance, at various checkpoints the processing resource 106 may output a status or other data of each thread. In other instances, the process metric collection component 102 may output a status or other data at various triggers associated with executing the threads 108, such as when a process starts a particular function or ends a particular function).

In one particular instance, the process metric collection component 102 may be configured to incorporate into a kernel or operating system associated with the processing resources 106. In this example, the process metric collection component 102 may be stored in the same access protected memory space as the kernel or operating system code. In this manner, the process metric collection component 102 is able to determine or identify each process or thread 108 scheduled or initiated by the scheduler 104 on the processing resource 106. Likewise, the process metric collection component 102 is able to record the completion and/or output of each process or thread 108 by the processing resource 106. Thus, the process metric collection component 102 is able to collect, record, and/or log each process or thread 108 scheduled, initiated, and completed by the processing resource 106 during the operation of the autonomous vehicle.

In some examples, the process metric collection component 102 may also have access to schedule data of the scheduler 104, such that the process metric collection component 102 is able to determine if any process is waiting or being otherwise prevented from execution on the processing resource 106. In this manner, any delays associated with processes or threads 108 failing to execute during any particular operational conditions may be determined. As discussed above, the process metric collection component 102 may be utilized with respect to processing resources 106 on an autonomous vehicle. In these examples, any delay in execution even for milliseconds may result in a collision or injury to a person. Thus, by implementing the process metric collection component 102 with respect to the processing resources 106 of the autonomous vehicle, any issue or bugs may be traced using the operational data of vehicle during operation reducing complexity or obliviating the need to recreate the bug in a lab on a test environment.

In the current implementation, the process metric collection component 102 may be configured to receive a global clock signal from a global clock 112, such that the process metric collection component 102 may generate time stamps associated with the execution of each thread 108 based on the global time stamp rather than an internal clock of the processing resource. In this manner, the recorded or logged schedule data and/or execution data generated by the process metric collection component 102 may be accurately analyzed and compared with log data associated with other processing resource of the autonomous vehicle. For instance, for safety purposes the autonomous vehicle may operate using multiple redundant computing device components. In this environment, if a bug or other issue occurs, it may be important during debugging to be able to analyze the processes and threads 108 executing simultaneously and/or during a similar time window on the various compute components in order to resolve the issue.

In the some examples, the process metric collection component 102 may be configured to cause a communication connection of the vehicle to transmit or send the logged or recorded data to a cloud-based debugging system via one or more networks. For instance, the process metric collection component 102 may record or log the schedule data and execution data associated with the scheduler 104 and the processing resource 106 into a memory onboard the vehicle. The process metric collection component 102 may also cause the recorded data (e.g., the stored schedule data and execution data) to be uploaded to the cloud-based debugging system on a periodic basis, in response to a trigger event (e.g., connection to the network or a predetermined amount of data being logged), or as a continuous stream.

In another specific example, the process metric collection component 102 may be configured to generate processing thresholds or metrics based at least in part on the logged or recorded data and to generate an alert or notification, if a particular thread 108 exceeds the corresponding processing threshold or metric. For instance, if a particular thread 108 typically completes execution within one to two milliseconds, the process metric collection component 102 may generate a corresponding process threshold to alert or notify an operator or particular system as to the delayed thread 108. In some specific cases, such as when the thread 108 is associated with an operation decision of an autonomous vehicle, the process metric collection component 102 may notify a decision making system of the vehicle that the thread has exceeded the expected execution time and, thereby, cause the decision making system to bring the vehicle to reduce speed or halt and/or notify repair personnel, operator, or passenger as to the delayed thread 108. In this manner, the process metric collection component 102 may collect data and monitor operations onboard and in substantially real time.

In some cases, the systems 110 may include various other processing systems associated with, for example, an autonomous vehicle. For instance, the systems may include a perception system, a localization system, a prediction system, a planning system, or other systems.

In the illustrated example, the processing resource 106 is shown as a single processing resource. However, it should be understood that the scheduler 104 and the process metric collection component 102 may be configured to, respectively, schedule and log data associated with processes executed on one or more processing resources. In some implementations, the processing resource 106 may be any suitable processor capable of executing instructions to process data and perform operations as described herein. By way of example and not limitation, the processing resource 106 may comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits, gate arrays, field programmable gate arrays, and other hardware devices can also be considered processors in so far as they are configured to implement encoded instructions.

Figure 2:
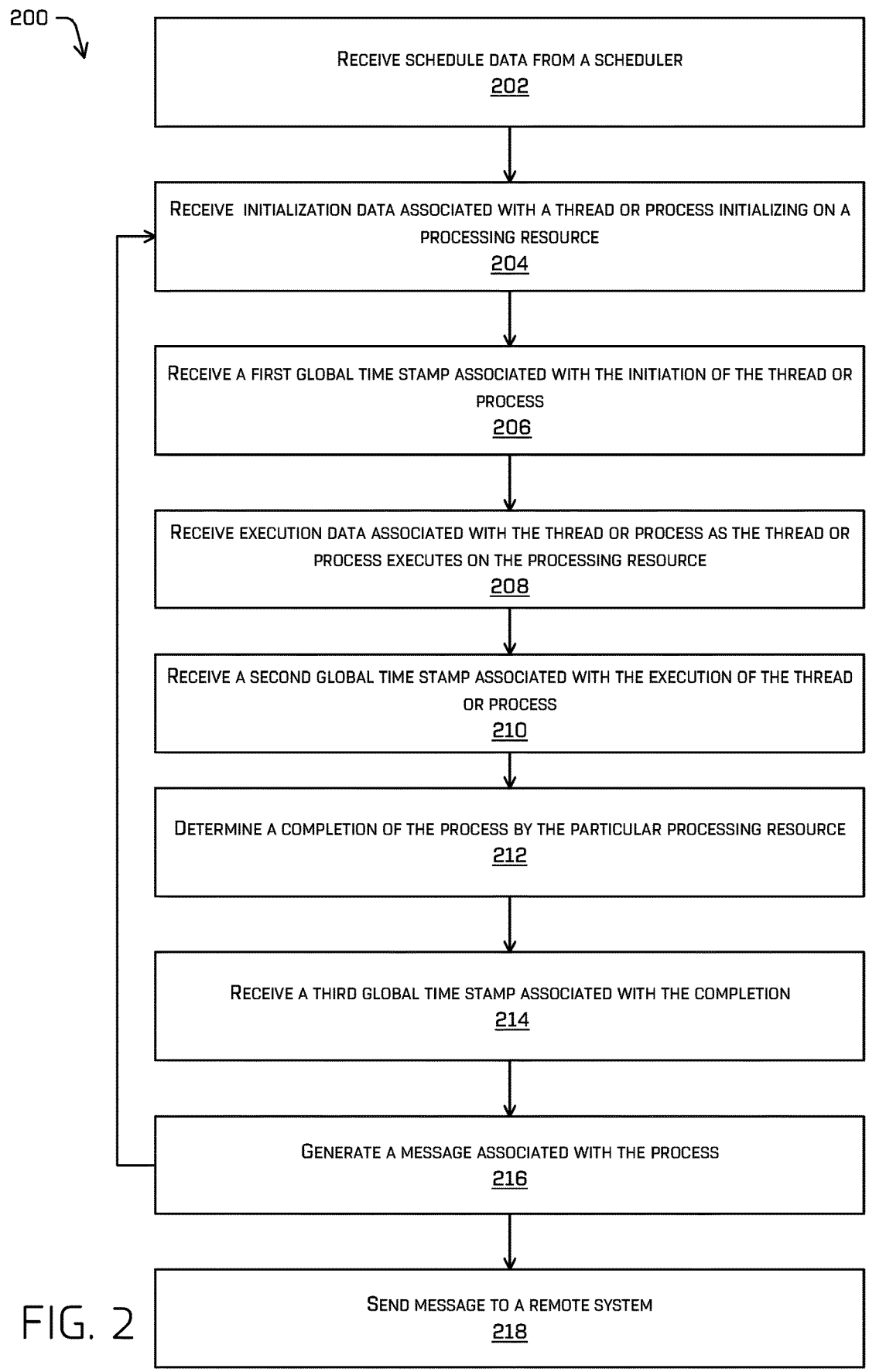
FIG. 2 is an example flow diagram illustrating an example process associated with the production system of FIG. 1, as described herein.

FIG. 2 is an example flow diagram illustrating an example process 200 associated with the production system of FIG. 1, as described herein. As discussed above, data and process metric collection components may be configured to track and record process and scheduler related metrics for each process or thread that is executed by production system while the production system is in operation. In some cases, the data and process metric collection components are configured to track and record each process of the production system across multiple processing resources using a global clock, such that if an issue occurs during operation, actual production data associated with each processing resource and each process is available to compare and analyze using synchronized time stamps without having to recreate the issue in a test environment.

At 202, a process metric collection component may receive schedule data from a scheduler. For instance, the schedule data may include various processes, the processing resource assigned to execute the process, any execution or thread dependencies (e.g., thread completions required to initiate the current process), etc.

At 204, the process metric collection component may receive initialization data associated with a thread or process initializing on a processing resource. For example, the process metric collection component may receive the initialization data from the scheduler or detect the initialization on the processing resource.

At 206, the process metric collection component may receive a first global time stamp associated with the initializing of the thread or process. For instance, as discussed above, the process metric collection component may be communicatively coupled to a global clock. The process metric collection component may receive clock signals from the global clock. In some cases, the global clock may be a high precision counter that tracks time in specified units or cycles. The global clock may be configured to provide the same signals to each compute component or processing resource associated with the autonomous vehicle, such that each compute component and each process metric collection component may log process or thread data using the global time stamp.

In another example, the process metric collection component may receive a local time stamp from a local clock associated with the processing resource executing the thread or process. The process metric collection component may initially include the local time stamp as the time the processing resource begins execution of the process or thread. In this example, at various periodical intervals, the process metric collection component may receive substantially simultaneously a reference global time stamp from the global clock and a reference local time stamp from the local clock. The process metric collection component may then determine a difference between the reference global time stamp and the reference local time stamp. Then the process metric collection component may adjust the local time stamp assigned to the process or thread by the difference. In this manner, the process metric collection component may utilize the local clock when recording the data associated with a process and then adjust the time stamps of the collected data at various intervals such that a global time stamp is still available when the captured process metrics and data is reviewed.

At 208, the process metric collection component may receive execution data associated with the thread or process as the thread or process executes on the processing resource. For instance, at various checkpoints the processing resource may output a status or other data of each thread being executed. In other instances, the process metric collection component 102 may output a status or other data at various triggers associated with executing the threads 108, such as when a process starts a particular function or ends a particular function.

At 210, the process metric collection component may receive a second global time stamp associated with the execution of the thread or process. In this manner, the process metric collection component may be able to associate the second time stamp the checkpoint or trigger and the execution data output by the processing resource. As discussed above, in an alternative example, the process metric collection component may again initially utilize a local time stamp from a local clock associated with the processing resource executing the thread or process to generate the time stamp for the captured data and then update or adjust the local time stamp using a comparison of an output of a local clock and an output of the global clock.

In the current example, the process 200 shows one instance of the process metric collection component capturing execution data while a thread or process is executed by the processing resource. However, it should be understood, that the process metric collection component may capture execution data at multiple times during the execution of a single thread and that during each instance a time stamp may be applied to the execution data.

At 212, the process metric collection component may determine a completion of the process by the particular processing resource. For instance, the process metric collection component may receive completion data associated with the thread or process executed by the processing resource. For example, the process metric collection component may receive the completion data from the scheduler or detect the completion on the processing resource.

At 214, the process metric collection component may receive a third global time stamp associated with the completion of the thread or process. In this manner, the process metric collection component may be able to associate the first time stamp with the initialization of the thread or process, the second time stamp associated with the execution, and the third time stamp with the completion of the thread or process and, thus, log the start time, end time, and an execution time span associated with the thread or process.

As discussed above, in an alternative example, the process metric collection component may initially utilize a local time stamp from a local clock associated with the processing resource executing the thread or process to generate the time stamp for the captured data and then update or adjust the local time stamp using a comparison of an output of a local clock and an output of the global clock.

At 216, the process metric collection component may generate a message associated with the thread or process. For example, the process metric collection component may aggregate data associated with each thread or process completed during a predetermined time period into a message or message that may be sent to a remote debugging system. In some cases, the process metric collection component may format the scheduler data based on a designated format for the message protocol. In some cases, the process metric collection component may be configured to generate the message or message based on certain criteria being meet or exceeded. In these cases, if the criteria have not been met or exceeded, the process 200 may return to 204 and, the process metric collection component may record additional data associated with an additional thread or process.

At 218, the process metric collection component may cause the message to be sent to a remote system. For example, the process metric collection component may cause the message or message to be sent to a cloud-based debugging system. In some cases, the uploading of the message may be performed on a periodic basis, in response to a trigger event, or as a continuous stream.

In the current example, the process 200 sends a single message at 218, however, it should be understood that in some implementations, messages may be sent to the remote system at periodic intervals, in response to various triggers (e.g., and amount of data collected), or, even in some cases, upon completion of capture of each instance of data (e.g., after steps 206, 210, and 214 in the current example).

In the current example, the process 200 is discussed with respect to a single thread or process executing on the processing resource. However, it should be apparent to one skilled in the art that the processing resource may have multiple threads or processes actively executing at the same time and that the process metric collection component may record data associated with each thread or process substantially simultaneously.

Figure 3:
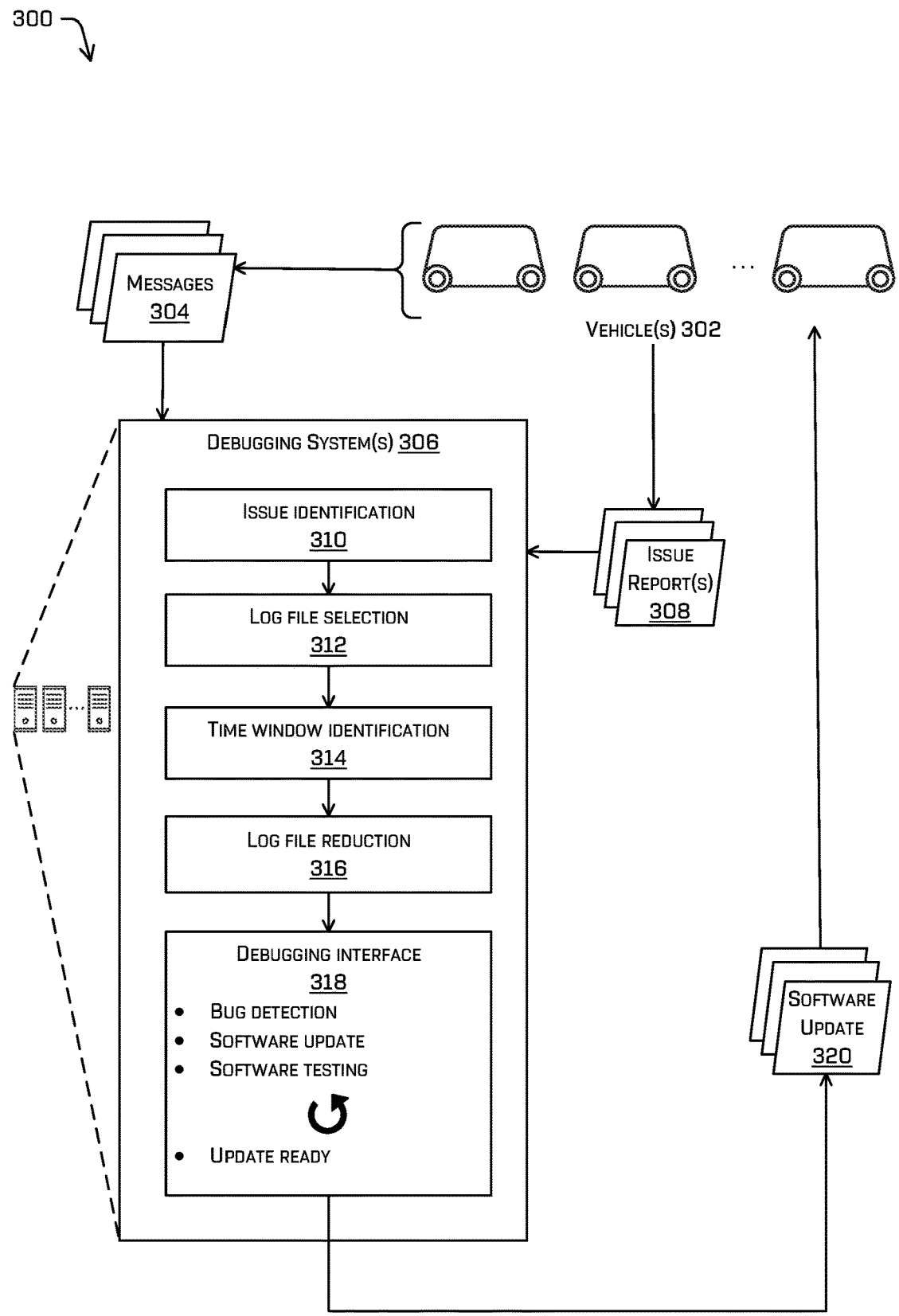
FIG. 3 is another flow diagram illustrating an example process of the production system of FIG. 1, as described herein.

FIG. 3 is another flow diagram illustrating an example process 300 of the production system of FIG. 1, as described herein. As discussed above, process metric collection components may be integrated into the kernel or operating system of processing resources onboard production autonomous vehicles 302 to record and log scheduler data and process or thread execution data as the processing resources execute instructions in actual operating environments.

In the illustrated example, the process metric collection components of the vehicles 302 may be configured to send or otherwise transmit messages 304 to a remote debugging system 306 via one or more wireless networks. The messages 304 may include log files, scheduler data, and/or process execution data for each processing resource on each vehicle 302. For example, in some cases, the vehicles 302 may include multiple redundant compute units for use to compare results and, thereby, determine if an issue is occurring and/or ensure the safety of any individuals riding in the vehicles 302. In other cases, the vehicles 302 may include drive units each having its own compute units, such that either end of the vehicle 302 may act as the front of the vehicle 302 based on a direction of travel.

At any time during operation, any of the vehicles 302 may generate an issue report 308. The issue report 308 may be generated by the process metric collection component or any other component associated with the operations of the vehicle 302. In other examples, issues that cause the generation of an issue report 308 may include but are not limited to detection of software performance or latency problems, failure of one or more process to execute within an expected threshold of time (or a process missing a deadline). In other examples, an issue may include a planning component or other decision making component may encounter a situation in which the vehicle 302 is forced to stop for the safety of the individuals riding in the vehicle 302, such as when the planning component is unable to make a decision, the planning component is receiving inconsistent data from one or more other systems, a location of an object present in the environment is unknown, the planning component is unable to predict a motion path of an object, among various other situations. In these cases, the vehicle 302 may come to a stop and send an issue report 308 that is received by the debugging system 306. In some cases, the issues may be user defined. Various types of scheduler and event data that may be recorded by the process metric collection component and sent as part of a message 304 as well as situations that may trigger an issue report can be found in patent application Ser. No. 16/224,385 entitled "Event-Based Data Logging" and filed on Dec. 18, 2018, which is incorporated herein by reference in its entirety.

Once an issue report 308 is received from a vehicle 302, the debugging system 306 may perform issue identification 310. For instance, in one example, the debugging system 306 may parse the issue report 308 to identify a time stamp associated with the cause of the issue report 308. As discussed above, the process metric collection component of the vehicle 302 is configured to time stamp the data within the message 304 using a global clock signal. Thus, the issue report 308 may also include a time stamp generated from the global clock signal even when a different component or system generated the issue report 308. Thus, the debugging system 306 may extract the vehicle 302 a vehicle identifier and a time stamp from the issue report 308. The debugging system 306 may then perform a log file section 312 based on the vehicle identifier. In some situations, such as when a processing resource associated with the issue report 308 is known, the debugging system 306 may also select log files based on the particular processing resource to further reduce the overall amount of data presented to the programmer.

The debugging system may also identify a time window identification 314 within the message 304 that includes the time indicated by the time stamp in the issue report 308 and reduce the overall amount of data by performing log file reduction 316 using the time window 314. As discussed above, the message 304 may include all of the scheduler data and process execution data of multiple processing resources onboard the vehicle 302 resulting in the amount of overall data within each of the message 304 being very large. For instance, in some cases, each message 304 may contain in the range of approximately 300 megabytes to 400 megabytes per minute. Thus, the debugging system 306 may select the log files by applying a time window as small as five milliseconds centered around the time stamp of the issue report 308.

Once the log files are limited to a number that may be parsed or examined by a programmer, the debugging system 306 may present the log files on a debugging interface 318. The programmer may review the logs, detect bugs, update the software code if necessary, and perform testing on the new software. For example, the log files and/or execution data may also be used to generate and/or train a model that may be used to test the new or edited code prior to shipping to a production system. Once the software update 320 is debugged and tested, the software update 320 may be pushed or sent to the vehicles 302 to prevent the issue from reoccurring during operation.

Figure 4:
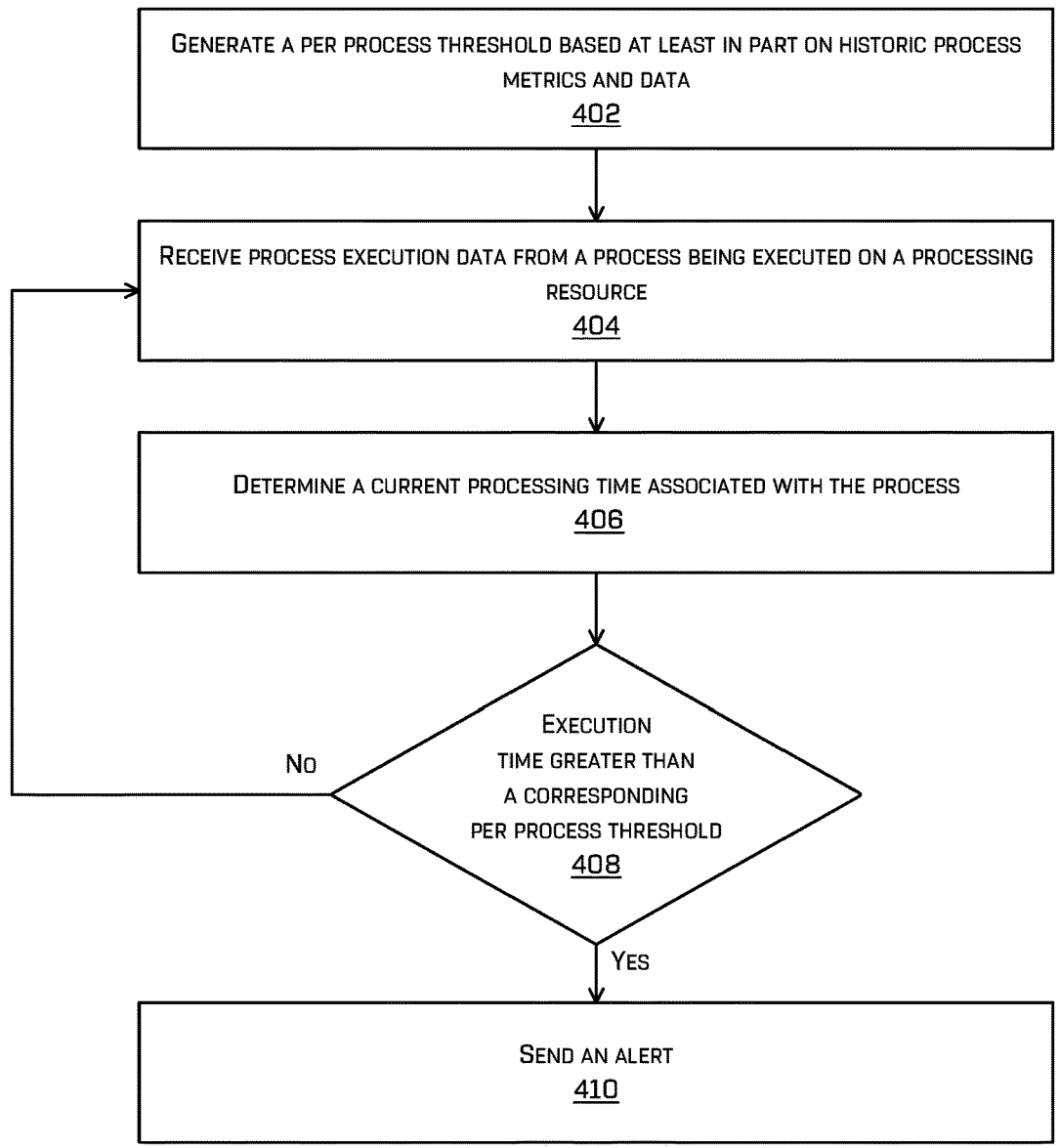
FIG. 4 is another flow diagram illustrating an example process of associated with monitoring the operations of a system with a process metric collection component, as described herein.

FIG. 4 is another flow diagram illustrating an example process 400 of associated with monitoring the operations of a system with a process metric collection component, as described herein. In some cases, the system, such as an autonomous vehicle, may utilize historical process metrics and data collected over a period of time to generate per process time thresholds associated with the execution of each or select processes being executed by a processing resources. In some examples, the thresholds may be utilized to determine if a process is stalled, waiting, or experience other issues (e.g., a hardware problem).

At 402, the process metric collection component and/or a monitoring component may generate a per process threshold based at least in part on historical process metrics and data. In some cases, the historical process metrics and data may be data collected by the process metric collection component for the corresponding process or thread on the specific processing resource, such that the threshold range may be tailored to past performance on an individualized process and resource basis. In other cases, the historical process metrics and data may be generic to the type of system, process, or resource and collected and complied across multiple systems. In some cases, the per process threshold may be a range of thresholds. For instance, if the system is a vehicle, then the range of thresholds may be based on a speed or velocity of the vehicle, a number of objects within a predefined distance of the vehicle, presence of a passenger, or a combination thereof. As one particular example, the threshold time may increase as the speed of the vehicle is reduced.

At 404, the process metric collection component and/or a monitoring component may receive execution data from a process being executed on a processing resource and, at 406, the process metric collection component or a monitoring component may determine a current processing time associated with the process based at least in part on the execution data and at least one time stamp received from a global and/or local clock. For instance, the execution data may include a status, an indication of that the process has achieved a particular check point, or a change in function. As discussed above, the process metric collection component may also receive a time stamp from a global clock or local clock that can be used to determine the current processing time by comparing to the time stamp associated with the initialization of the process.

At 408, the process metric collection component and/or a monitoring component may determine if the execution time is greater than a corresponding per process threshold. If the execution time is less than the per process threshold, the process 400 may return to 404 as the process is within normal and expected operating parameters. However, if the execution time is greater than the per process threshold (or the per process threshold range—the threshold value at the current speed or velocity), than the process 400 may advance to 410.

At 410, the process metric collection component and/or a monitoring component may send an alert. For example, the alert may cause another system of the vehicle to change an operational state or status of the vehicle, reduce the velocity of the vehicle, and/or bring the vehicle to a stop. In other cases, the alert may be sent to an operator (either local or remote) to allow the remote operator to take control of the operations of the vehicle or to a maintenance personnel such that the vehicle can be marked for repair or investigation upon return.

In some cases, the process 400 may also be used to determine if the system (e.g., vehicle) is operating within normal operations or at a nominal level. For instance, the per process thresholds may be configured to represent a minimum level or nominal level of operations expected out of the system. In some cases, the normal operation may include determining that a process starting and stopping without any exceptions, no faulty memory calls, processes not being terminated early or late (e.g., finishing on time), processing resource and/or memory utilization is a threshold percentage, no disengagements of a system occurred during processing, etc.

Figure 5:
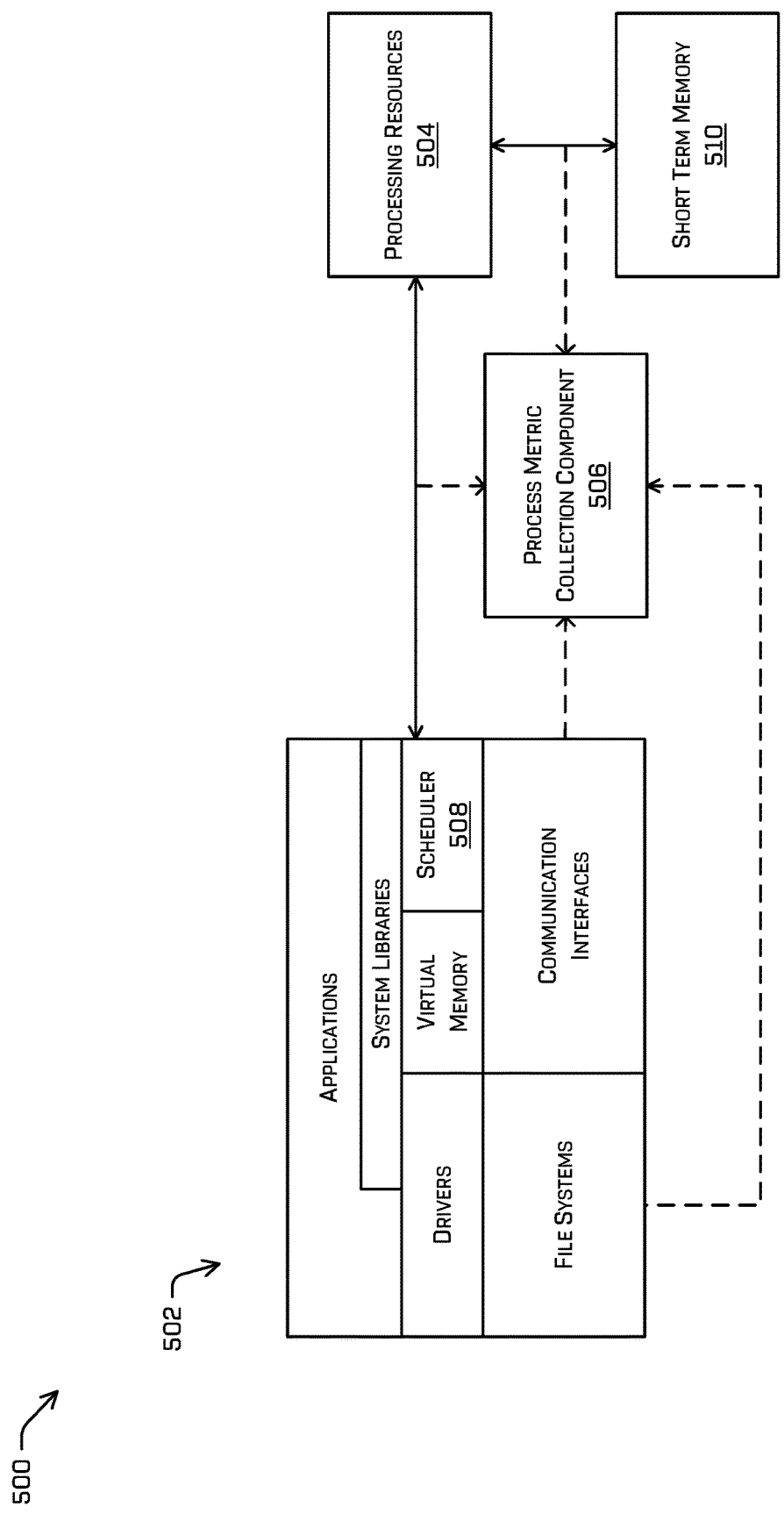
FIG. 5 is an example pictorial diagram illustrating an example architecture of the production system of FIG. 1, as described herein.

FIG. 5 is an example pictorial diagram illustrating an example architecture 500 of the production system of FIG. 1, as described herein. In the illustrated example, a Kernel 502 associated with a processing resource 504 is shown. In this example, the process metric collection component 506 is configured to receive data from the scheduler 408 of the Kernel 502 as well as to record or capture initializations and completions of threads and or processes on the processing resource 504. For instance, in the illustrated example, the process metric collection component 506 may be configured to record data sent between the scheduler 508 and the processing resource 504 and between the processing resource 504 and a short-term memory 510 (e.g., one or more caches).

Figure 6:
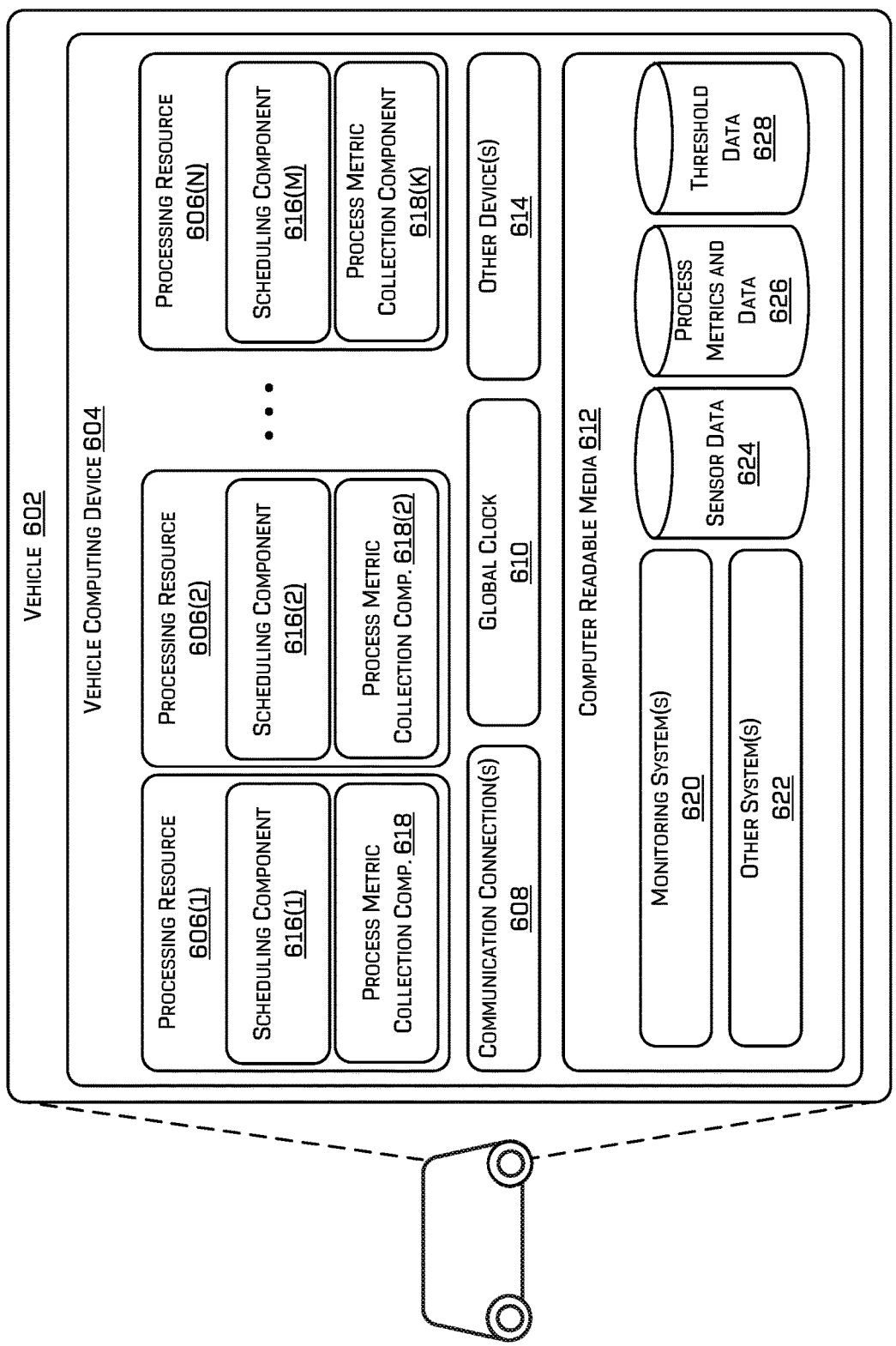
FIG. 6 is a block diagram of an example system for implementing the production system of FIG. 1, as described herein.
Figure 7:
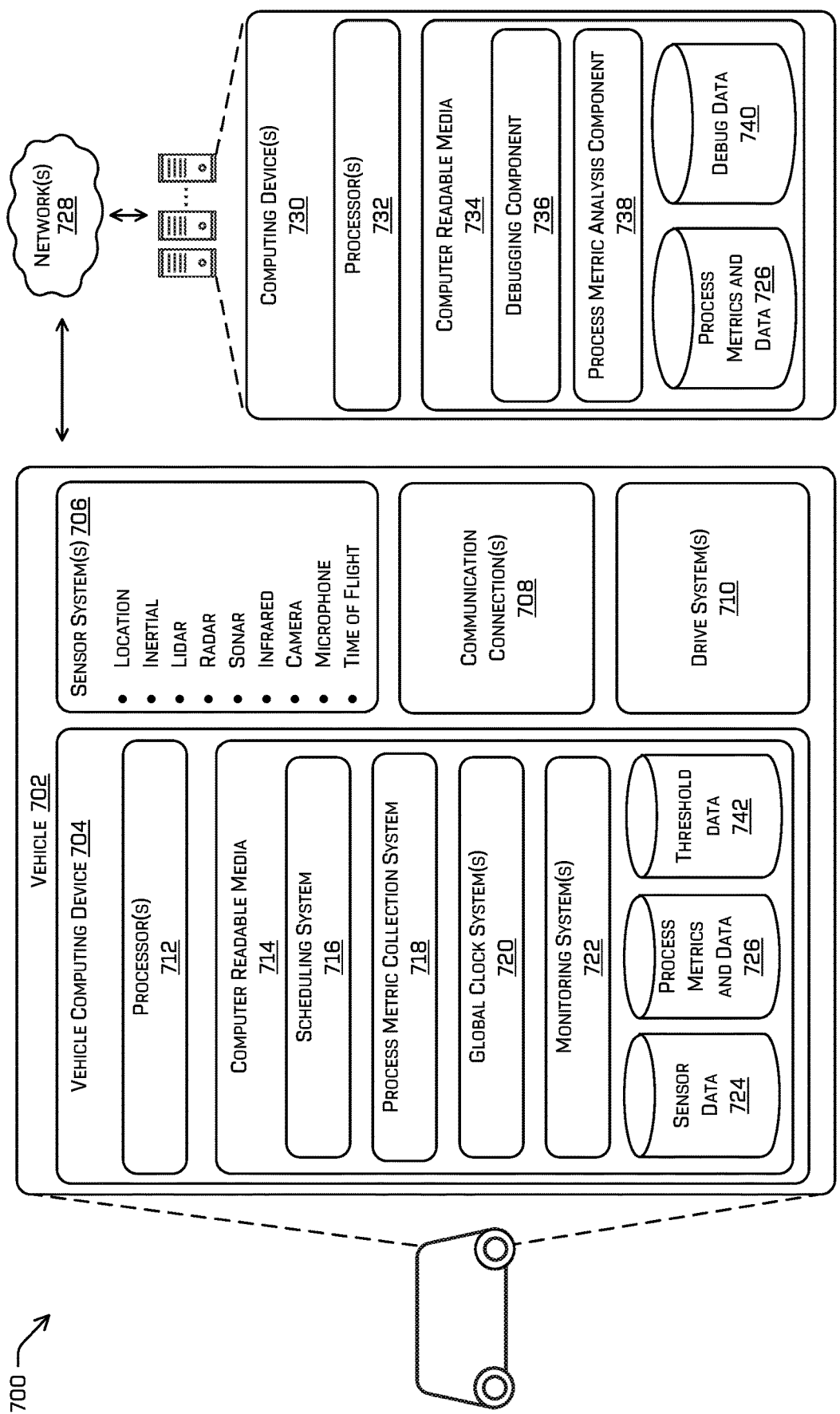
FIG. 7 is another block diagram of an example system for implementing the production system of FIG. 1, as described herein.

FIGS. 6 and 7 illustrate example systems for implementing the techniques described herein, in accordance with embodiments of the disclosure. In some examples, the systems may include one or multiple features, processing resources, components, and/or functionality of embodiments described herein with reference to FIGS. 1-4. As discussed above, in some embodiments, the systems may include autonomous vehicles.

FIG. 6 is a block diagram of an example system 600 for implementing the production system of FIG. 1, as described herein. In this embodiment, the system 600 is an autonomous vehicle 602 that may include a vehicle computing device 604, multiple processing resources 606(1)-(N), one or more communication connections 608, a global clock 610, computer readable media 612, as well as other devices 614 (e.g., sensor systems, navigation systems, drive systems, or other systems associated with an autonomous vehicle).

As discussed above, the vehicle computing device 604 may include one or more processing resources 606. Each of the processing resources 606(1)-(N) may be associated with a scheduler 616(1)-(M) and a process metric collection component 618(1)-(K). The process metric collection components 618(1)-(K) may be configured to track and record scheduler 616 related metrics for each process or thread that is executed by corresponding processing resource 606 while the vehicle 602 is in operation.

In some cases, the process metric collection components 618(1)-(K) may be configured to receive a global clock signal from the global clock 610 such that the recorded data may be time stamped and later compared across multiple processing resources 606. Thus, if an issue occurs during operation of the vehicle 602, actual production data associated with each processing resource 606 and each process or thread is available to compare and analyze using synchronized time stamps without having to recreate the issue in a test environment.

In some case, the process metric collection components 618(1)-(K) may be configured to send over one or more networks the logs or messages to a remote debugging system for storage via the communication connections 608. For example, the communication connection(s) 608 may facilitate communication with other remote computing device(s) such as the debugging system. For instance, the communications connection(s) 608 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

Additionally, in some example, the process metric collection components 618(1)-(K) may be configured to generate processing thresholds or metrics based at least in part on the captured process metrics and data 626 and to generate an alert or notification, if a particular thread exceeds the corresponding processing threshold or metric. For instance, if a particular thread typically completes execution within one to two milliseconds, the process metric collection components 618(1)-(K) may generate a corresponding process threshold to alert or notify an operator or particular system as to the delayed thread. In some examples, the thresholds used to determine if an alert or notification should be sent may be based at least in part on a speed or velocity of the vehicle 602. For instance, as the vehicle 602 increases in speed or velocity the processing thresholds may be reduced as a delay of 0.5 milliseconds at 15 miles per hour may be acceptable but a delay of 0.1 milliseconds at 60 miles per hour may not.

In the current example, each of the processing resources 606(1)-(N) may be associated with a corresponding scheduler 616(1)-(M) and a corresponding process metric collection component 618(1)-(K). However, in other examples, a global scheduler 616 and a global process metric collection component 618 may be associated with the processing resources 606.

The computer readable media 612 may be communicatively coupled with the one or more processing resources 606(1)-(N). In the illustrated example, the computer readable media 612 of the vehicle computing device 604 may store monitoring systems 620 as well as other systems 622 (such as a perception system, a localization system, a prediction system, a planning system, navigation system, system controllers, etc.). The computer readable media 612 may also store data, such as sensor data 624, process metrics and data 626 recorded by the process metric collection components 618(1)-(K) (e.g., log files, event data, scheduler data, execution data, etc.), and threshold data 628, such as a threshold associated with an expected execution time of various processes and threads.

In some examples, in addition to or in lieu of the process metric collection components 618 monitoring the execution of the processes and threads, the monitoring system 620 may also be configured to generate processing thresholds or metrics based at least in part on the captured process metrics and data 626 and the speed or velocity of the vehicle 602. In these examples, the monitoring system 620 may generate the alert or notification, if a particular thread or process exceeds the corresponding processing threshold or metric for the particular thread or process (or system or subsystem) at the vehicle's 602 current speed. In this manner, the process metric collection components 618 and the monitoring system 620 may together monitor operations onboard the vehicle 602 and detect any potential problems in substantially real time.

FIG. 7 is another block diagram of an example system 700 for implementing the production system of FIG. 1, as described herein. In some embodiments, the system 700 may include a vehicle 702. The vehicle 702 may include a vehicle computing device 704, one or more sensor systems 706, one or more communication connections 708, and one or more drive systems 710.

The vehicle computing device 704 may include one or more processors 712 (or processing resources) and computer readable media 714 communicatively coupled with the one or more processors 712. In the illustrated example, the vehicle 702 is an autonomous vehicle; however, the vehicle 702 could be any other type of vehicle, or any other system (e.g., a robotic system, a camera enabled smartphone, etc.). In the illustrated example, the computer readable media 714 of the vehicle computing device 704 stores a scheduling system 716, a process metric collection component 618, global clock system 620, monitoring system 722 as well as other systems (e.g., planning system, object prediction system, or other system associated with an autonomous vehicle). The computer readable media 714 may also store sensor data 724, process metrics and data 726 (e.g., log files, scheduler data, event data, executing data, etc.), and threshold data (e.g., process thresholds based on historical process metrics and data 726 and operational parameters, such as a speed or velocity, of the vehicle 702). Though depicted in FIG. 6 as residing in computer readable media 714 for illustrative purposes, it is contemplated that the scheduling system 716 and the process metric collection system 718 may be integrated with the processor 712, as illustrated above with respect to FIG. 6. In some implementations, it should be understood that the systems as well as data stored on the computer readable media may additionally, or alternatively, be accessible to the vehicle 702 (e.g., stored on, or otherwise accessible by, other computer readable media remote from the vehicle 702).

In at least one example, the scheduling system 716 may be configured to schedule and/or assign processes or threads to be performed on the processors 712. For example, the scheduling system 716 may manage thread or process dependencies, load balancing, resource sharing, throughput, thread or process wait time, etc. In some cases, the scheduling system 716 may include multiple schedulers, such as a process scheduler, long-term scheduler, admission scheduler, medium-term scheduler, CPU scheduler, etc.

In some cases, the process metric collection system 718 may be communicatively coupled to or between the scheduling system 716 and the processors 712 and between the processors 712 and the other systems 720. In one particular instance, the processing metric collection component 718 may be incorporated into a kernel or operating system associated with the processors 712. In this example, the process metric collection system 718 may be stored in the same access protected memory space of the computer readable media 714 as the Kernel or operating system code. In this manner, the process metric collection system 718 is able to determine or identify each process or thread scheduled or initiated by the scheduling system 716 to execute on the processors 712. Likewise, the process metric collection system 718 is able to record the completion and/or output of each process or thread by the processors 712. Thus, the process metric collection system 718 is able to collect, record, and/or log each process or thread scheduled, initiated, and completed by the processors 712 during the operation of the autonomous vehicle 702.

In some examples, the process metric collection system 718 may also have access to schedule or event data, such that the process metric collection system 718 is able to determine if any process is waiting or being otherwise prevented from execution on the processors 712 by the scheduling system 716. In this manner, any delays associated with processes or threads failing to execute during any particular operational conditions may be determined.

As discussed above, the process metric collection system 718 may be utilized with respect to processors 712 on the vehicle 702. In these examples, any delay in execution even for milliseconds may result in increased risk to vehicle(s) or objects in an environment person. Thus, by implementing the process metric collection component 618 with respect to the processors 712 of the production vehicle 702, any issue or bugs may be traced using the operational data of vehicle 702 during operation, thereby reducing any need to recreate the bug on a test environment.

In the current example, the global clock system 710 may be configured to provide a uniform clock signal to the various systems of the vehicle 702 including the process metric collection system 718. In this manner, the process metric collection system 718 may generate time stamps associated with the execution of each thread or process based on the global time stamp rather than an internal clock of a particular processor 712. In this manner, the recorded or logged schedule data and/or execution data generated by the process metric collection system 718 may be accurately analyzed and compared with log data associated with other processors 712 of the vehicle 702.

In some examples, the monitoring system 722 may also be configured to generate processing thresholds data 742 based at least in part on the captured process metrics and data 726 and operational parameters of the vehicle 702, such as a speed or velocity. In these examples, the monitoring system 722 may generate the alert or notification to various systems of the vehicle 702, such as the planning systems, perception systems, prediction systems, or drive systems 710, if a particular thread or process exceeds the corresponding processing threshold data 726 at the vehicle's 702 current operational parameters. In this manner, the process metric collection components 718 and the monitoring system 722 may together monitor operations onboard the vehicle 702 and detect any potential problems in substantially real time.

The vehicle 702 can also include one or more communication connection(s) 708 that enable communication between the vehicle 702 and one or more other local or remote computing device(s). For instance, the communication connection(s) 708 may facilitate communication with other local computing device(s) on the vehicle 702 and/or the drive system(s) 710. Also, the communication connection(s) 708 may allow the vehicle 702 to communicate with other nearby computing device(s) (e.g., other nearby vehicles, traffic signals, etc.). The communications connection(s) 708 also enable the vehicle 702 to communicate with remote teleoperations computing device or other remote services.

The communications connection(s) 708 may include physical and/or logical interfaces for connecting the vehicle computing device 704 to another computing device (e.g., computing device(s) 730) and/or a network, such as network(s) 728. For example, the communications connection(s) 708 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In some examples, the process metric collection system 718 may be configured to cause the communication connections 708 of the vehicle 702 to transmit or send the logged or recorded data (e.g., the process metrics and data 726) to the computing device(s) 730. In some instances, the process metric collection system 718 may then cause the process metrics and data 726 to upload to the computing devices 730 on a periodic basis, in response to a trigger event (e.g., connection to the network 728 or a predetermined amount of data being logged), or as a continuous stream.

In at least one example, the sensor system(s) 706 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 706 can include multiple instances of each of these or other types of sensors. For instance, the lidar sensors may include individual lidar sensors located at the corners, front, back, sides, and/or top of the vehicle 702. As another example, the camera sensors can include multiple cameras disposed at various locations about the exterior and/or interior of the vehicle 702. The sensor system(s) 706 may provide input to the vehicle computing device 704. Additionally, or alternatively, the sensor system(s) 706 can send sensor data, via the one or more networks 728, to the one or more computing device(s) at a particular frequency, after a lapse of a predetermined period of time, in near real-time, etc.

In at least one example, the vehicle 702 can include one or more drive systems 710. In some examples, the vehicle 702 may have a single drive system 710. In at least one example, if the vehicle 702 has multiple drive systems 710, individual drive systems 710 can be positioned on opposite ends of the vehicle 702 (e.g., the front and the rear, etc.). In at least one example, the drive system(s) 710 can include one or more sensor systems 706 to detect conditions of the drive system(s) 710 and/or the surroundings of the vehicle 702, as discussed above. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 710. In some cases, the sensor system(s) 706 on the drive system(s) 710 can overlap or supplement corresponding systems of the vehicle 702.

In at least one example, the components discussed herein can process sensor data 724, as described above, and may send their respective outputs, over the one or more network(s) 728, to one or more computing device(s) 730. In at least one example, the components discussed herein may send their respective outputs to the one or more computing device(s) 730 at a particular frequency, after a lapse of a predetermined period of time, in near real-time, etc.

In some examples, the vehicle 702 can send sensor data to one or more computing device(s) 730 via the network(s) 728. In some examples, the vehicle 702 can send raw sensor data 724 to the computing device(s) 730. In other examples, the vehicle 702 can send processed sensor data 724 and/or representations of sensor data (for instance, the object perception tracks) to the computing device(s) 730. In some examples, the vehicle 702 can send sensor data 724 to the computing device(s) 730 at a particular frequency, after a lapse of a predetermined period of time, in near real-time, etc. In some cases, the vehicle 702 can send sensor data (raw or processed) to the computing device(s) 730 as one or more log files.

The computing device(s) 730 may include processor(s) 732 and computer readable media 734 storing a debugging component 736, a process metric analysis component 738, as well as process metrics and data 726 received from the vehicle 702 and debug data 740. In some examples, the debugging component 736 may include a debugging interface that may be used by one or more programmers to trace any issues via the process metrics and data 726 and to thereby edit or update the software of one or more systems 722 operating on the vehicle 702. In some cases, the process metrics and data 726 presented to the programmers via the interface may be limited to a time window and/or to processes associated with one or more particular processor 712.

In some implementations, the process metric analysis component 738 may be configured to generate various metrics (e.g., cache misses, average wait, average throughput, available bandwidth, etc.). In some cases, the process metric analysis component 738 may be configured to generate one or more models from the process metrics and data 726 that may be used for machine learning and/or future code testing.

The processor(s) 712 of the vehicle 702 and the processor(s) 732 of the computing device(s) 730 may be any suitable processor capable of executing instructions to process data and perform operations as described herein. By way of example and not limitation, the processor(s) 712 and 732 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 714 and 734 are examples of non-transitory computer-readable media. The computer readable media 714 and 734 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 7 is illustrated as a distributed system, in alternative examples, components of the vehicle 702 can be associated with the computing device(s) 730 and/or components of the computing device(s) 730 can be associated with the vehicle 702. That is, the vehicle 702 can perform one or more of the functions associated with the computing device(s) 730, and vice versa.

EXAMPLE CLAUSES

A. A system comprising: one or more processors; and one or more non-transitory computer readable media storing instructions executable by the one or more processors, wherein the instruction, when executed, cause the system to perform operations comprising: collecting scheduling data associated with a process from a scheduling component associated with the first processing resources; generating a first time stamp associated with the scheduling data based on a local clock signals; collecting execution data associated with the process from the processing resource during execution of the process; generating a second time stamp associated with the execution data based on the local clock signals; collecting completion data associated with the completion of the process by the processing resource; generating a third time stamp associated with the completion data based on the local clock signals; receiving substantially simultaneously a local reference clock signal and a global reference clock signal, the local reference clock signal associated with the first processing resource and the global reference clock signal associated with the system; determining a difference between the local reference clock signal and the global reference clock signal; adjusting the first time stamp, the second time stamp, and the third time stamp based at least in part on the difference; generating at least one message including at least one of the scheduling data, the execution data, or the completion data; and causing the one or more communication connections to send the message to a remote system via a network.

B. The system of paragraph A, the operations further comprising: determining an execution threshold for the process based at least in part on the speed of the vehicle and the scheduling data, execution data, and completion data associated with the process executing on the first processing resource.

C. The system of paragraph A, the wherein determining a time associated with the execution of the process by the processing resource exceeds an execution threshold; and sending, in response to determining the time exceeded the execution threshold, an alert to an operational system of the vehicle.

D. A method comprising: receiving, by a metric collection component, a first indication of an initialization of a process on a processing resource; determining, by the metric collection component, first time data associated with the process initialization on the processing resource; receiving, by the metric collection component, a second indication of a process completion by the processing resource; determining, by the metric collection component, second time data associated with the process completion by the processing resource; receiving substantially simultaneously a local reference clock signal and a global reference clock signal, the local reference clock signal associated with the processing resource and the global reference clock signal associated with a system including the processing resource and at least one additional processing resource; determining a difference between the local reference clock signal and the global reference clock signal; adjusting the first time data and the second time data based at least in part on the difference; generating a message comprising data associated with the process, the first time data, and the second time data; and sending the message to a remote system.

E. The method of paragraph D, further comprising determining an execution threshold for the process based at least in part on a speed of a vehicle associated with the processing resource and the data associated with the process.

F. The method of paragraph D, wherein the data associated with the process comprises one or more of an identifier associated with the processing resource.

G. The method of paragraph D, the data associated with the process comprises a total processing time, one or more process dependencies, one or more cache hits associated with the process, and one or more cache misses associated with the process.

H. The method of paragraph D, further comprising: determining a time associated with an execution of the process by the processing resource exceeds an execution threshold, the execution threshold variable based on a speed of a vehicle including the processing resource; and sending, in response to determining the time exceeded the execution threshold, an alert to an operational system of the vehicle.

I. The method of paragraph H, further comprising reducing, by the operational system, a speed of the vehicle in response to the time exceeding the execution threshold.

J. The method of paragraph D, further comprising: receiving, by the metric collection component, a third indication of an initialization of a second process on a second processing resource, the second processing resource different than the first processing resource; determining, by the metric collection component, third time data associated with the second process initialization on the second processing resource; receiving, by the metric collection component, a fourth indication of a process completion of the second processing resource by the second processing resource; determining, by the metric collection component, fourth time data associated with the second process completion by the second processing resource; receiving substantially simultaneously a second local reference clock signal and the global reference clock signal, the second local reference clock signal associated with the second processing resource; determining a second difference between the second local reference clock signal and the global reference clock signal; adjusting the third time data and the fourth time data based at least in part on the second difference; generating a second message comprising data associated with the second process, the third time data, and the fourth time data; and sending the second message to the remote system.

K. The method of paragraph D, further comprising: receiving, by the metric collection component, a third indication associated with the execution of the process from the processing resource; determining, by the metric collection component, third time data associated with the execution of the process; and wherein the message comprises the third time data.

L. The method of paragraph D, wherein the metric collection component is part of a kernel associated with the processing resource.

M. The method of paragraph D, further comprising sending the alert to a remote operator associated with the autonomous vehicle.

N. The method of paragraph D, wherein the process is associated with one or more of localization, prediction, or perception of the autonomous vehicle.

O. A non-transitory computer-readable medium storing instructions that, when executed, cause one or more processors to perform operations comprising: identifying an individual process executing on the processor, the individual process associated with normal operation of an autonomous vehicle; capturing data associated with the execution of the individual process; receiving schedule data associated with the one or more processors; determining that the execution of the individual process has exceeded an execution threshold; generating an alert based at least in part on the data associated with the execution of the individual process and the schedule data; and sending the alert to a system configured to make operational decisions for the autonomous vehicle.

P. The non-transitory computer-readable medium of paragraph O, wherein the execution threshold is variable based on a speed of the autonomous vehicle.

Q. The non-transitory computer-readable medium of paragraph O, wherein the process is associated with one or more of localization, prediction, or perception.

R. The non-transitory computer-readable medium of paragraph O, wherein the execution data include first time data and the operations further comprising: receiving substantially simultaneously a local reference clock signal associated with the processor and a global reference clock signal associated with the autonomous vehicle; determining a difference between the local reference clock signal and the global reference clock signal; and adjusting the time data based at least in part on the second difference.

S. The non-transitory computer-readable medium of paragraph O, the operations further comprising: reducing a speed of the vehicle in response to the execution threshold being exceeded.

T. The non-transitory computer-readable medium of paragraph O, further comprising sending the alert to a remote system via one or more networks.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIGS. 5 and 6 may utilize the processes and flows of FIGS. 1-3.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
a first processing resource;
one or more communication connections;
one or more non-transitory computer readable media storing instructions, that when executed by one or more processors, cause the one or more processors to perform operations comprising:
collecting scheduling data associated with a process from a scheduling component associated with the first processing resource, wherein the process is associated with one or more of localization, prediction, or perception;
generating a first time stamp associated with the scheduling data based on a local clock signals;
collecting execution data associated with the process from the first processing resource during execution of the process;
generating a second time stamp associated with the execution data based on the local clock signals;
collecting completion data associated with completion of the process by the first processing resource;
generating a third time stamp associated with the completion data based on the local clock signals;
receiving substantially simultaneously a local reference clock signal and a global reference clock signal, the local reference clock signal associated with the first processing resource and the global reference clock signal associated with the vehicle;
determining a difference between the local reference clock signal and the global reference clock signal;
adjusting the first time stamp, the second time stamp, and the third time stamp based at least in part on the difference;
generating at least one message including at least one of the scheduling data, the execution data, or the completion data; and
causing the one or more communication connections to send the message to a remote system via a network.

2. The vehicle of claim 1, wherein the operations further comprise:
determining an execution threshold for the process based at least in part on speed of the vehicle and the scheduling data, execution data, and completion data associated with the process executing on the first processing resource.

3. The vehicle of claim 1, wherein the operations further comprise:
determining a time associated with the execution of the process by the first processing resource exceeds an execution threshold; and
sending, in response to determining the time exceeded the execution threshold, an alert to an operational system of the vehicle.

4. A method comprising:
receiving, by a metric collection component, a first indication of an initialization of a process on a processing resource, wherein the process is associated with one or more of localization, prediction, or perception;
determining, by the metric collection component, first time data associated with the initialization on the processing resource;
receiving, by the metric collection component, a second indication of a process completion by the processing resource;
determining, by the metric collection component, second time data associated with the process completion by the processing resource;
receiving substantially simultaneously a local reference clock signal and a global reference clock signal, the local reference clock signal associated with the processing resource and the global reference clock signal associated with a system including the processing resource and at least one additional processing resource;
determining a difference between the local reference clock signal and the global reference clock signal;
adjusting the first time data and the second time data based at least in part on the difference;
generating a message comprising data associated with the process, the first time data, and the second time data; and
sending the message to a remote system.

5. The method of claim 4, further comprising determining an execution threshold for the process based at least in part on a speed of a vehicle associated with the processing resource and the data associated with the process.

6. The method of claim 4, wherein the data associated with the process comprises one or more of an identifier associated with the processing resource.

7. The method of claim 4, wherein the data associated with the process comprises a total processing time, one or more process dependencies, one or more cache hits associated with the process, and one or more cache misses associated with the process.

8. The method of claim 4, further comprising:
determining a time associated with an execution of the process by the processing resource exceeds an execution threshold, wherein the execution threshold is based on a speed of a vehicle including the processing resource; and
sending, in response to determining the time exceeded the execution threshold, an alert to an operational system of the vehicle.

9. The method of claim 8, further comprising reducing, by the operational system, a speed of the vehicle in response to the time exceeding the execution threshold.

10. The method of claim 4, wherein the processing resource is a first processing resource, the method further comprising:
    receiving, by the metric collection component, a third indication of an initialization of a second process on a second processing resource, the second processing resource different than the first processing resource;
    determining, by the metric collection component, third time data associated with the initialization of the second process on the second processing resource;
    receiving, by the metric collection component, a fourth indication of a process completion of the second processing resource by the second processing resource;
    determining, by the metric collection component, fourth time data associated with the process completion of the second process by the second processing resource;
    receiving substantially simultaneously a second local reference clock signal and the global reference clock signal, the second local reference clock signal associated with the second processing resource;
    determining a second difference between the second local reference clock signal and the global reference clock signal;
    adjusting the third time data and the fourth time data based at least in part on the second difference;
    generating a second message comprising data associated with the second process, the third time data, and the fourth time data; and
    sending the second message to the remote system.

11. The method of claim 4, further comprising:
    receiving, by the metric collection component, a third indication associated with execution of the process from the processing resource;
    determining, by the metric collection component, third time data associated with the execution of the process; and
    wherein the message comprises the third time data.

12. The method of claim 4, wherein the metric collection component is part of a kernel associated with the processing resource.

13. The method of claim 4, further comprising sending an alert to a remote operator associated with an autonomous vehicle.

14. One or more non-transitory computer-readable media storing instructions that, when executed, cause one or more processors to perform operations comprising:
    identifying an individual process executing on the processor, the individual process associated with normal operation of a vehicle, wherein the individual process is associated with one or more of localization, prediction, or perception;
    capturing data associated with the execution of the individual process;
    receiving schedule data associated with the one or more processors;
    determining that the execution of the individual process has exceeded an execution threshold;
    generating an alert based at least in part on the data associated with the execution of the individual process and the schedule data; and
    sending the alert to a system configured to make operational decisions for the vehicle.

15. The one or more non-transitory computer-readable media of claim 14, wherein the execution threshold is variable based on a speed of the vehicle.

16. The one or more non-transitory computer-readable media of claim 14, wherein the data associated with the execution of the individual process include time data and the operations further comprising:
    receiving substantially simultaneously a local reference clock signal associated with the processor and a global reference clock signal associated with the vehicle;
    determining a difference between the local reference clock signal and the global reference clock signal; and
    adjusting the time data based at least in part on the difference.

17. The one or more non-transitory computer-readable media of claim 14, the operations further comprising:
    reducing a speed of the vehicle in response to the execution threshold being exceeded.

18. The one or more non-transitory computer-readable media of claim 14, further comprising sending the alert to a remote system via one or more networks.

* * * * *